United States Patent
Dellac et al.

(10) Patent No.: US 7,987,036 B2
(45) Date of Patent: Jul. 26, 2011

(54) METHOD OF MANAGING THE BRAKING OF AN AIRCRAFT BY PREDICTING ITS MOVEMENTS ON AN AIRPORT

(75) Inventors: Stephane Dellac, Tournefeuille (FR); Arnaud Jacquet, Clamart (FR); Antoine Esteban, Gentilly (FR)

(73) Assignee: Messier-Bugatti, Velizy Villacoublay (FR)

( * ) Notice: Subject to any disclaimer, the term of this patent is extended or adjusted under 35 U.S.C. 154(b) by 643 days.

(21) Appl. No.: 11/714,112

(22) Filed: Mar. 6, 2007

(65) Prior Publication Data

US 2007/0271019 A1    Nov. 22, 2007

(30) Foreign Application Priority Data

Mar. 13, 2006  (FR) ...................................... 06 02182

(51) Int. Cl.
*G06F 7/70* (2006.01)

(52) U.S. Cl. ................ 701/70; 701/3; 701/79; 701/301; 340/947; 340/961

(58) Field of Classification Search ................ 701/3, 15, 701/16, 70, 117, 200, 301
See application file for complete search history.

(56) References Cited

U.S. PATENT DOCUMENTS

| | | | | |
|---|---|---|---|---|
| 3,706,969 A * | 12/1972 | Paredes | ........................ | 340/989 |
| 3,855,571 A * | 12/1974 | Massa | ........................ | 340/990 |
| 4,122,522 A * | 10/1978 | Smith | ........................ | 701/15 |
| 4,404,633 A * | 9/1983 | Goicoechea | ........................ | 701/70 |
| 4,430,715 A * | 2/1984 | Gentet et al. | ........................ | 701/76 |
| 5,047,942 A | 9/1991 | Middleton et al. | | |
| 5,668,541 A * | 9/1997 | Coquin et al. | ........................ | 340/959 |
| 5,968,106 A * | 10/1999 | DeVlieg et al. | ........................ | 701/70 |
| 6,107,943 A * | 8/2000 | Schroeder | ........................ | 340/945 |
| 6,253,126 B1 * | 6/2001 | Palmer | ........................ | 701/14 |
| 6,804,598 B2 * | 10/2004 | Eckert et al. | ........................ | 701/71 |
| 2003/0110849 A1 * | 6/2003 | Lonzinski et al. | ........................ | 73/121 |
| 2005/0171654 A1 | 8/2005 | Nichols et al. | | |

FOREIGN PATENT DOCUMENTS

EP    0 895 929 A2    2/1999
EP    1 496 413 A1    1/2005

* cited by examiner

*Primary Examiner* — Mark Hellner
*Assistant Examiner* — Redhwan Mawari
(74) *Attorney, Agent, or Firm* — Sughrue Mion, PLLC

(57) ABSTRACT

The invention relates to a method of managing the braking of an aircraft while taxiing on an airport, the method comprising, on the basis of characteristics for a sequence of movements of the aircraft along at least one given path to be followed by the aircraft on the airport, the step of deducing information concerning the braking to be performed so that the aircraft does indeed travel in application of said sequence of movements.

11 Claims, 2 Drawing Sheets

FIRST PATH

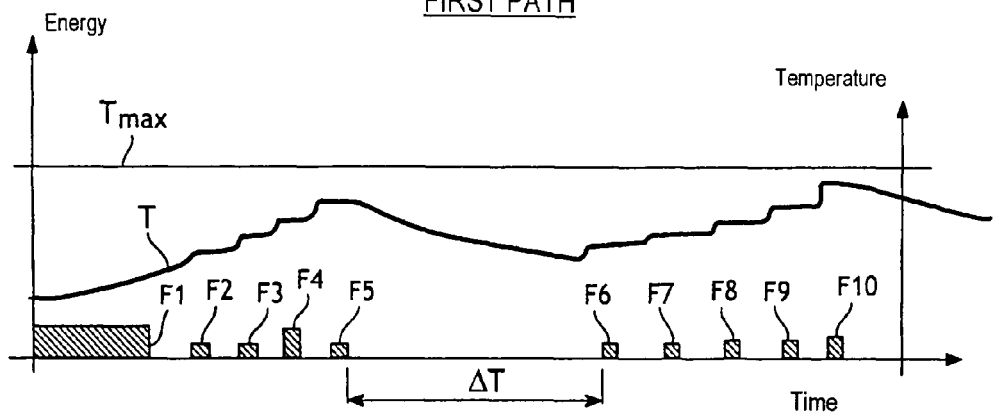
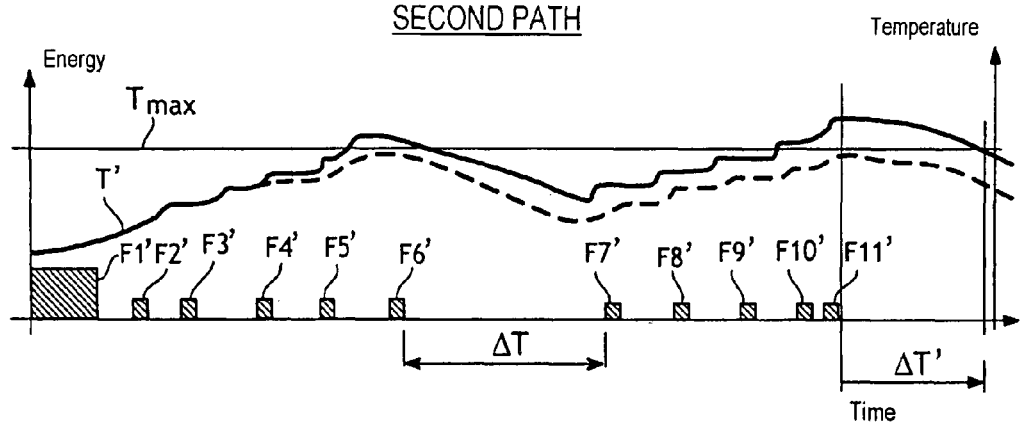
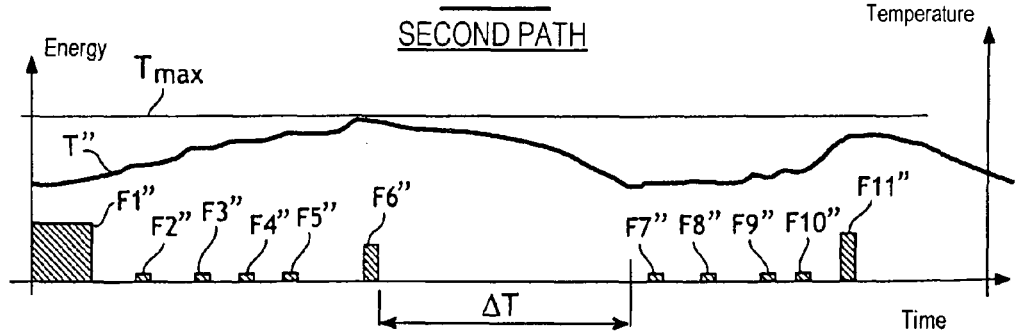

METHOD OF MANAGING THE BRAKING OF AN AIRCRAFT BY PREDICTING ITS MOVEMENTS ON AN AIRPORT

The invention relates to a method of managing the braking of an aircraft by predicting its movements on an airport.

BACKGROUND OF THE INVENTION

In general, an aircraft is braked in response to the pilot requesting braking, either by the pilot pressing on the brake pedals, or by selecting an automatic mode of braking (the "autobrake" function).

Means have recently been available for tracking accurately the path followed by an aircraft on an airport. These means are used in particular for reducing the risks of collision, e.g. between one aircraft and another aircraft or any other stationary or moving obstacle.

Tracking the paths gives precise knowledge about the movements of aircraft on an airport, and in particular the sequences of movements performed by aircraft along such paths (in terms of position, speed, and acceleration as functions of time).

OBJECT OF THE INVENTION

The invention seeks to make use of these new possibilities of tracking the path of an aircraft on an airport in order to improve management of aircraft braking.

BRIEF DESCRIPTION OF THE INVENTION

In order to achieve this object, the invention provides a method of managing the braking of an aircraft while taxiing on an airport, the method comprising, on the basis of characteristics for a sequence of movements of the aircraft along at least one given path to be followed by the aircraft on the airport, the step of deducing information concerning the braking to be performed so that the aircraft does indeed travel in application of said sequence of movements.

Thus, by predicting the future path to be followed by the aircraft and the sequence of aircraft movements along that path, the inertial characteristics of the movements (position, speed, acceleration) can be deduced, thereby making it possible to determine information relating to future braking operations, and thus to predict the way in which the braking operations will be performed.

By determining information concerning braking in accordance with the invention various possibilities are made available.

For example, the information relating to braking makes it possible, with the help of a thermal model, to predict how the temperature of the friction elements will vary, thus making it possible to calibrate numerical models of brake performance better, or indeed to predict the lengths of time that will be needed for the brakes too cool down once the aircraft has stopped at the terminal or at the runway threshold.

Such predictions also make it possible to compare a plurality of potential paths with one another from the point of view of brake usage, thus making it possible for example to select the path that will make least use of the brakes, or to optimize the application of the brakes along a given path. Such prediction also makes it possible to compare a plurality of sequences of movements along a single path with one another on the basis of criteria concerning brake usage.

BRIEF DESCRIPTION OF THE DRAWINGS

The invention can be better understood in the light of the following description with reference to the figures of the accompanying drawings, in which:

FIG. 2 is a graph as a function of time showing the braking and the mean temperature of the brakes of the aircraft if the aircraft follows the first path;

FIG. 3 is a graph similar to the graph of FIG. 2, but for the second path; and

FIG. 4 is a graph similar to the graph of FIG. 2 for a variant sequence of movements along the second path.

DETAILED DESCRIPTION OF THE INVENTION

Figure 1:
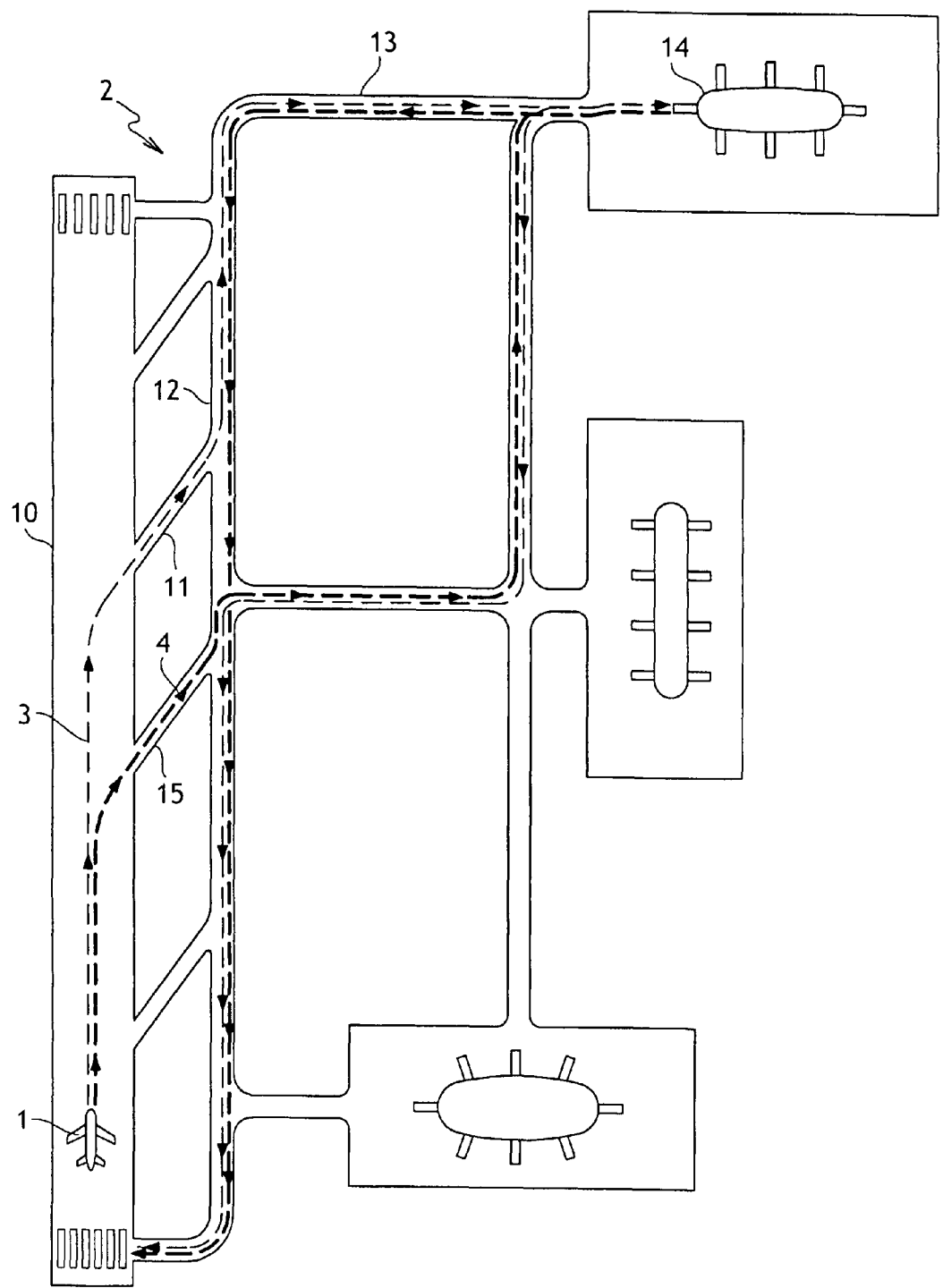
FIG. 1 is a simplified view of an airport showing two possible paths for an aircraft on said airport.

With reference to FIG. 1, an aircraft 1 landing at an airport 2 might taxi on said airport following a plurality of paths.

The figure shows a first path 3 in fine dashed lines going from the threshold of the runway and terminating at the terminal to which airport control seeks to send the aircraft.

The braking computer of the aircraft 1 is programmed, on the basis of knowledge of this path, e.g. as proposed by the airport control tower, to estimate a sequence of movements of the aircraft along the path, i.e. how the position and the speed of the aircraft are to vary over time in order to follow the path. This sequence of movements is determined so as to comply with various criteria such as maximum taxiing speed on the airport, required stop points, or indeed a maximum transit time between the instant of landing and the instant of arrival at the terminal, and also as a function of various parameters specific to the aircraft such as its weight, landing speed . . . .

Thus, for example, along the first path 3 shown herein, the estimated sequence of movements is made up as follows. The aircraft 1 is initially on the runway 10 on which braking of medium intensity and long duration has been performed in order to slow the speed of the aircraft down from a landing speed to a taxiing speed. Thereafter, the aircraft 1 leaves the runway via an oblique taxiway 11.

Thereafter the aircraft runs onto a main taxiway 12 parallel to the runway 10. At the end of the taxiway 12, the pilot brakes the aircraft 1 and turns slowly to the right through 90° using the aircraft steering control. Finally, the aircraft comes up to the terminal 14 at walking speed and the pilot stops the aircraft close to the terminal.

FIG. 2 shows the sequence of braking operations F1 to F5 corresponding to the above-described sequence of movements along the first portion of the path 3, the braking sequence being represented by rectangles on the time axis. The height of each rectangle corresponds to the intensity of each braking operation, while the length of each rectangle corresponds to the duration of the braking. The energy dissipated by each of the braking operations corresponds to the area of each rectangle, with the total dissipated energy being equal to the sum of the areas of all of the rectangle.

Then, after pausing for a certain length of stopover time ΔT, during which the brakes cool down, the aircraft begins to move again along the second portion of the first path enabling the aircraft to reach the threshold of the runway. As explained above, the aircraft 1 needs to perform a certain number of braking operations in order to comply with the positions and the speeds of its sequence of movements along this second portion of the path.

In FIG. 2, there can be seen the braking sequence F6 to F10 corresponding to the second portion of the path 3.

The estimated braking sequence over the entire path 3 includes in this example determining the following data:
- the number of braking operations to be performed;
- the braking durations;
- the energy to be dissipated during each braking operation; and
- the spacings between two consecutive braking operations.

Preferably, this estimation takes account of the topology of the airport, and in particular uphill and downhill slopes, and also all of the constraints on aircraft taxiing on the airport, such as required times, stops, or speeds.

In a particular implementation using the above data, an estimate is made of the temperature that would be reached by each of the brakes if the aircraft were indeed to follow the first path 3 with the intended sequence of movements.

The way temperature varies is obtained by implementing a thermal model incorporated in the braking computer of the aircraft and that takes account of the various previously-estimated braking operations. Each of these operations causes energy to be dissipated, thereby contributing to heating the friction elements of the brakes. The temperature of the brake is thus liable to vary because of this heating, and also because of natural cooling by convection.

The thermal model serves to predict the way the temperature of each of the brakes will vary, given, in particular, the state of wear of the friction elements in each of the brakes, and thus the thickness of said friction elements.

For the first path 3, the braking operations shown in FIG. 2 in the form of rectangles enable the predictable variation in brake temperature to be plotted (the temperature T of only one of the brakes is shown herein for greater clarity). In this example, it can be seen that the temperature T of the brake in question remains below a limit temperature Tmax.

By way of example, Tmax is a limit temperature above which the aircraft is not authorized to take off. Here, since the temperature Tmax is not reached, the aircraft can take off immediately after reaching the threshold of the runway.

It is thus verified in advance by the method of the invention that the turnaround time of the aircraft on the airport will not be lengthened by a requirement for the brakes to cool down if the aircraft follows the first path 3.

The temperature Tmax may also represent a threshold T1 above which the friction elements are subjected to wear at a high rate, such that it is preferable to avoid reaching the limit temperature Tmax in order to preserve the friction elements.

It is thus verified in advance by the method of the invention that the friction elements will remain within a temperature range leading to moderate wear only, thereby contributing to lengthening the lifetime of the friction elements.

Now, with reference to a second path 4 shown in FIG. 1, starting from the same runway threshold as the first path 3 and terminating at the same terminal, the braking computer of the aircraft estimates a sequence of movements for the aircraft and deduces therefrom the braking sequence shown in FIG. 3. On the second path 2, the aircraft brakes harder on the runway 10 than with the first path 3, thus enabling it to leave the runway sooner via an oblique taxiway 15 upstream from the oblique taxiway 11.

Once the braking sequence F1' . . . F11' has been determined, the braking computer deduces therefrom how brake temperature will vary (only one temperature T' is plotted herein). This time, it can be seen that the temperature T' of the brake concerned exceeds the temperature Tmax on two occasions.

The second excess requires the aircraft to wait for a period ΔT' that is long enough for the temperature of the brake in question to drop below the limit temperature, before the aircraft can be authorized to take off, thereby increasing the turnaround time of the aircraft on the airport.

The first excess temperature does not in itself lead to any waiting time, but it does lead to the friction elements of the brakes operating in a temperature range in which they are liable to wear rapidly, and that is not desirable.

If the pilot has the option, it is immediately possible to select the first path 3 instead of the second path 4, thereby enabling the pilot to minimize the turnaround time on the airport while also preserving the friction elements of the brakes.

According to a particular aspect of the invention, the thermal model used by the braking computer is preferably designed in such a manner, that in the event of a path such as the second path 4 where it is detected that the limit temperature Tmax will probably be exceeded, a simulation is carried out of the effect of applying forced cooling to the brakes. Forced cooling is obtained by activating cooling fans that are fitted in conventional manner to the brakes of the aircraft, with activation being controlled by the pilot, or directly by the braking computer.

The effect of forced cooling on the temperature of the brakes is shown in FIG. 3 by the bold dashed-line curve. It can be seen that in this example forced cooling enables the temperature curve to be brought back below the limit temperature Tmax so the pilot now has the option of following the second path 4 without suffering major wear of the friction elements in the brakes and within a required waiting time.

According to another particular aspect of the invention, the braking computer is programmed, in the event of paths like the second path 4 where it is detected that it is probable the limit temperature Tmax will be exceeded, to generate a new sequence of movements along the path under consideration, by introducing a new sequence of braking operations. As shown in FIG. 4, the new sequence of movements conserves the initial braking enabling the aircraft to leave the runway 10 quickly, but it allows the aircraft to taxi at a higher speed, so that the intermediate braking operations are not so hard. Only the final braking operation prior to stopping (either at the terminal or at the runway threshold) is somewhat harder. It can be seen that this new distribution of braking forces makes it possible to keep the temperature T" of the brakes below the limit temperature Tmax.

According to yet another aspect of the invention, braking computer is programmed, in the event of paths such as the second path 4 in which it is detected that it is probable the limit temperature Tmax will be exceeded, to simulate a plurality of distributions for braking operations amongst the brakes of the aircraft, and to retain the distribution that enables the temperatures of all of the brakes to remain below the maximum temperature Tmax, while naturally also complying with sequence of movements requirements along the path.

Thus, by predicting braking operations in accordance with the invention, the braking computer enables a plurality of strategies to be investigated in order to select a path, or for a given path, it enables a particular sequence of movements along the path to be selected, so as to avoid reaching temperatures that lead to rapid wear of the friction element of the brakes, or else so as to avoid any need to wait at the runway threshold prior to takeoff.

The paths may be determined in advance and incorporated in a database. The paths are determined either by listing all possible paths from one point to another on the airport, or else they are established statistically using recordings of aircraft movements on the airport, the recordings being obtained by the tracking means mentioned in the introduction.

Under such circumstances, the sequence of movements along each of the paths can also be predetermined, for example statistically, so that predicting the braking and the variation in the temperatures of the friction elements can be carried out easily, given knowledge of the weight of the aircraft and of the wear state of the brakes.

The paths can also be established in real time as a function of traffic on the airport. The braking computer is then adapted to update braking predictions as a function of changes to the path or to the sequence of movements along the path. By way of example, airport control may require a non-predicted halt, thereby requiring additional braking that needs to be taken into account.

The invention is not limited to the above description, but on the contrary covers any variant coming within the ambit defined by the claims.

In particular, although it is stated that the method of the invention is implemented by the braking computer of the aircraft, the method of the invention could be implemented on an airport traffic control computer, e.g. located in the airport control tower. The method of the invention can then be implemented simultaneously for all of the aircraft present on the airport, thus making it possible to optimize braking conditions simultaneously for all of the aircraft present on the airport. In a variant, the paths and the sequences of movements along those paths can be determined by the airport traffic control computer, while the aircraft braking computer serves solely to predict braking operation, the path and the sequence of movements being imposed by the traffic control computer. Under such circumstances, the braking computer is advantageously adapted to share braking forces amongst the various brakes of the aircraft so as to ensure that the temperatures of the friction elements of the brakes remain for as long as possible outside the temperature range in which the friction elements wear in accelerated manner.

Furthermore, although it is stated that the information relating to braking is used for optimizing criteria such as wear of the friction elements of the brakes or turnaround time of the aircraft on the airport, the information can also be used for optimizing other criteria, e.g. for limiting the number of times the brakes are applied for greater passenger comfort or for limiting fatigue stressing on the landing gear or on the structure of the aircraft.

What is claimed is:

1. A method of managing the braking of an aircraft while taxiing on an airport-runway, the method comprising:
   - selecting at least one given path for the aircraft to follow on the airport pathway, including at least one of a taxiway and a runway;
   - selecting a sequence of movements along the at least one given path which depend on a plurality of factors that effect the braking of the aircraft, said factors comprising inertial characteristics, including position, speed and acceleration, along the at least one given path to be followed by the aircraft on the airport pathway;
   - determining braking information based on the selected sequence of movements to be performed so that the aircraft is automatically controlled to travel in application of said sequence of movements along said at least one given path; and
   - automatically instructing the aircraft to follow the selected sequence of movements and to use the determined braking information.

2. A method according to claim 1, in which the determined braking information comprises the following:
   - a number of braking operations to be performed;
   - a plurality of braking durations;
   - an energy dissipated on each of the number of braking operations; and
   - a spacing between at least two consecutive braking operations.

3. A method according to claim 1, wherein the selected path is selected from a list of predetermined paths.

4. A method according to claim 3, wherein the sequence of movements along said path are determined based on statistical data relating to predetermined movements of the aircraft on the airport pathway.

5. A method according to claim 1, wherein the selected path or the sequence of movements along said path are modified in real time based on information concerning airport traffic.

6. A method according to claim 1, further comprising optimizing an operating criterion by minimizing wear of the friction elements incorporated in a plurality of brakes of the aircraft.

7. A method according to claim 6, wherein optimizing the operating criterion further comprises, for at least one given path, determining a sequence of movements for which the friction elements of each of the plurality of brakes presents a temperature that remains below a predetermined maximum temperature corresponding to the given path.

8. A method according to claim 6, wherein optimizing said operating criterion further comprises determining a distribution of braking between the plurality of brakes of the aircraft so that each of the brakes presents a temperature that remains under a predetermined maximum temperature along the path.

9. A method according to claim 1, further comprising determining a variation in temperature of at least one of a plurality of brakes on the aircraft based on a thermal model.

10. A method according to claim 9, further comprising triggering forced cooling of the brakes when the brakes will exceed a maximum predetermined temperature.

11. A method according to claim 8, wherein braking forces are shared amongst the plurality of brakes of the aircraft so that the temperature of the friction elements of the brakes remains outside of a predetermined temperature range in which the friction elements wear in an accelerated manner.

* * * * *